2 Sheets—Sheet 1.

L. SWEARINGEN.

Stock Car.

No. 4,336. Reissued April 11, 1871.

*Witnesses:-*
Wm H. Rowe
Jas. L. Peyton

*Inventor:-*
Lee Swearingen
By his att'y
Wm D. Baldwin

N. PETERS, Photo-Lithographer, Washington, D. C.

2 Sheets—Sheet 2.

L. SWEARINGEN.

Stock Car.

No. 4,336. Reissued April 11, 1871.

*Witnesses:-*
Wm. H. Rowe.
Joel Sayton

*Inventor:-*
Lee Swearingen
By his Atty
Wm. A. Baldwin

N. PETERS, Photo-Lithographer, Washington, D. C.

UNITED STATES PATENT OFFICE.

LEE SWEARINGEN, OF GRAFTON, WEST VIRGINIA, ASSIGNOR TO THE NATIONAL CATTLE-CAR COMPANY, OF SALEM, OHIO.

IMPROVEMENT IN STOCK-CARS.

*Specification forming part of Letters Patent No.* 28,517, *dated May* 29, 1860; *reissue No.* 4,336, *dated April* 11, 1871.

*To all whom it may concern:*

Be it known that I, LEE SWEARINGEN, formerly of Valley River Falls, in the county of Marion and State of Virginia, but now residing at Grafton, in the county of Taylor and State of West Virginia, have invented certain new and useful Improvements in the Construction of Cars for Transporting Cattle and Stock upon Railroads, of which the following is a specification:

In transporting horses, cattle, sheep, swine, &c., upon railways, cars of different construction must be used for the larger and smaller animals, or else, with the latter, much loss of car-room will ensue in proportion to the live weight carried.

It is of great utility in transporting horses and horned cattle to separate them by partitions to prevent the stronger ones from injuring the weaker ones; and owing to the height of such stock, these partitions must necessarily extend nearly the whole depth of the car. For sheep or hogs, however, partitions are not so essential, neither is so much vertical space required; consequently, such cars are usually made double-decked.

The object of my invention, therefore, is readily to convert a stock-car from what is known as a "double-decker," adapted to carry small stock, into a "single-decker," adapted to carry horses and horned cattle.

My invention consists in combining with a stock-car swinging partitions, so constructed that the car may readily be converted from a double-decked one into a single-decked one, or vice versa, as hereinafter set forth.

Figure 1:
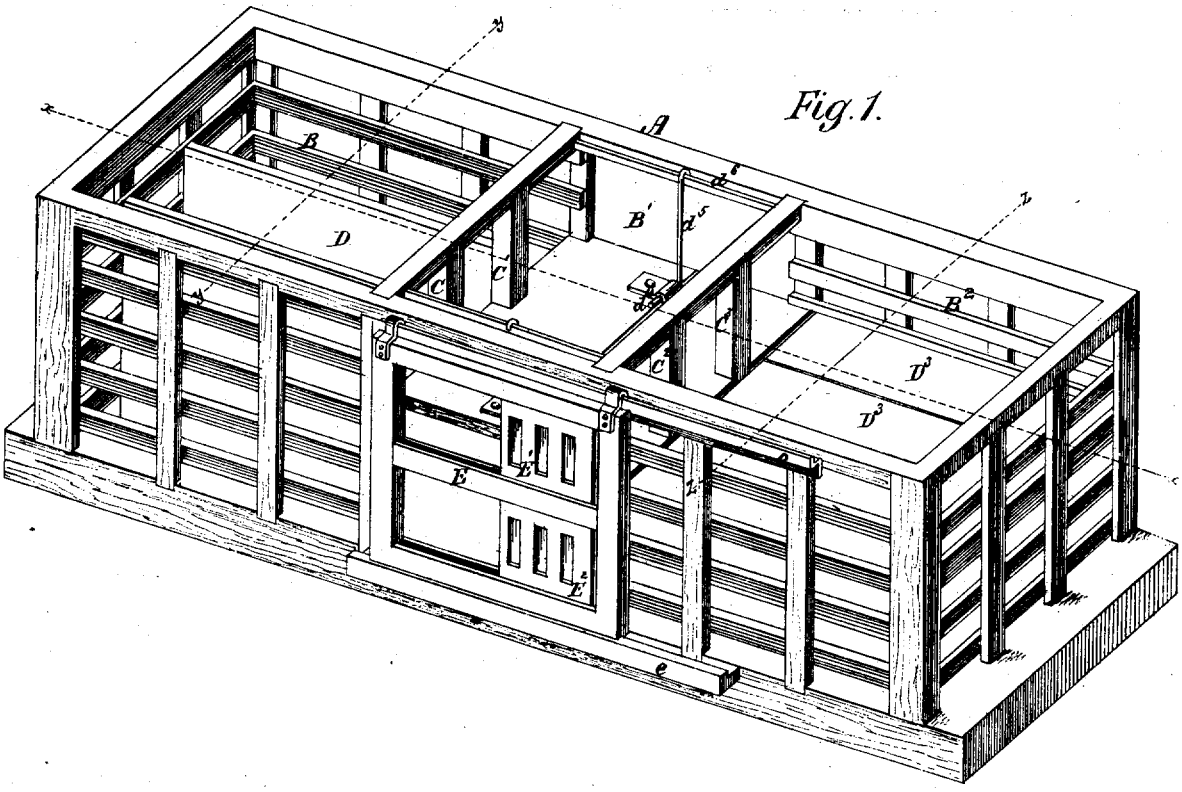
Figure 2:
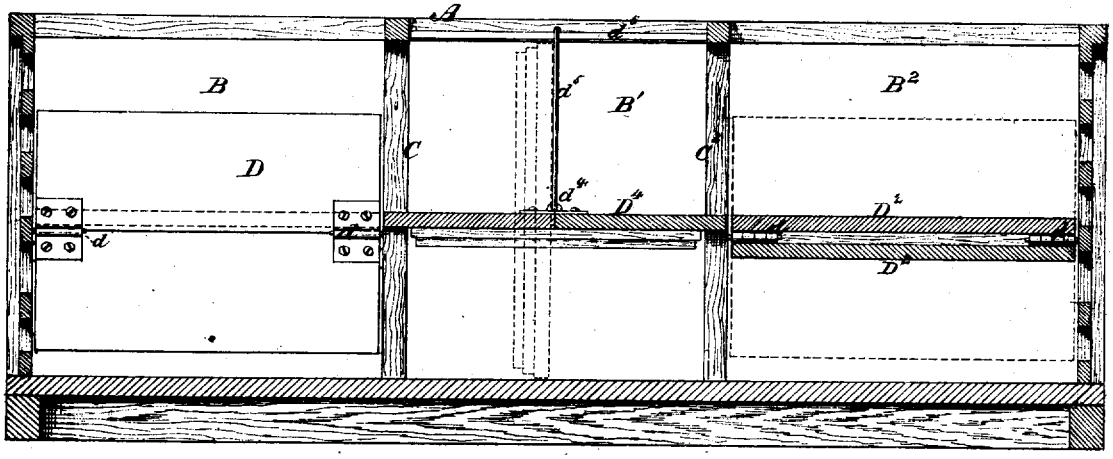
Figure 3:
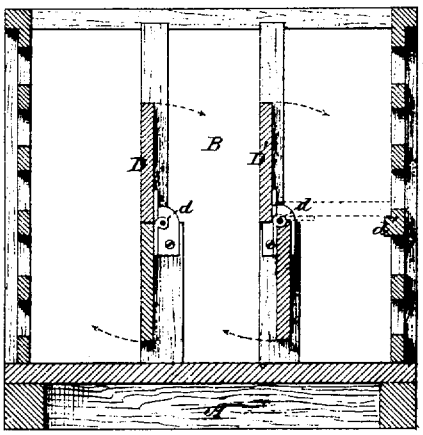
Figure 4:
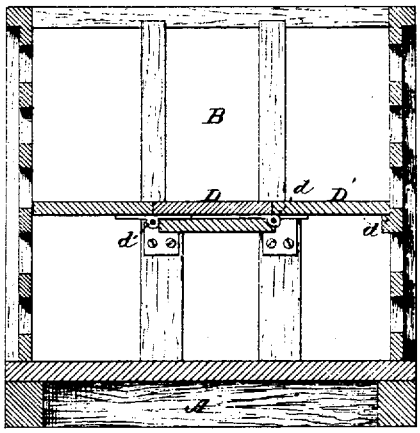
Figure 5:
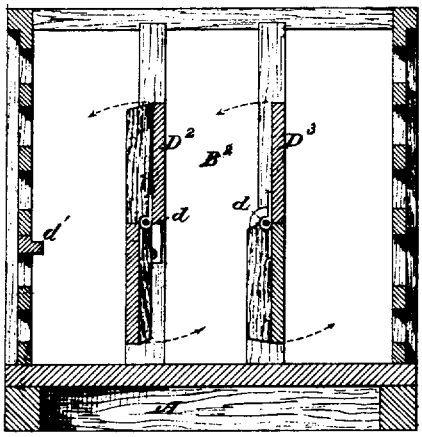
Figure 6:
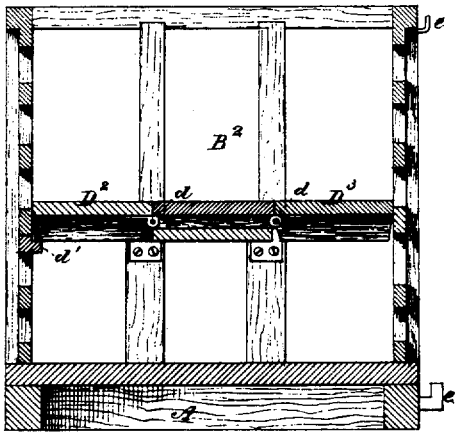

In the accompanying drawings, which represent so much of a car embracing my improvements as is necessary to illustrate the invention herein claimed, Figure 1 represents a view, in perspective, of the body of my improved car with the roof removed to show the interior. Fig. 2 represents a vertical longitudinal section through the car at the line *x x* of Fig. 1. Fig. 3 represents a vertical transverse section through the car at the line *y y* of Fig. 1, looking toward the end of the car, showing the partitions arranged vertically to divide the car into stalls for large stock. Fig. 4 represents a similar view, but with the partitions turned horizontally to convert the car into a "double-decker" for the transportation of small stock. Figs. 5 and 6 represent similar sections at the line *y y* of Fig. 1, looking in a direction the opposite of that shown in Figs. 3 and 4, showing a difference in the construction of the partitions.

The body A of the car may be constructed in any well-known way, and mounted upon trucks of the usual construction. The car is shown as constructed with three subdivisions, B $B^1$ $B^2$; but, of course, a greater or less number might be used, and they might be made either by tight or skeleton partitions, or simple studding or posts. In this instance posts C $C^1$ $C^2$ $C^3$ are arranged across the car on each side of the doorway. Between these posts and the ends of the car partitions or platforms D $D^1$ $D^2$ $D^3$ are hung upon pivots or hinges *d*, or other means of shifting or turning them, so that one or all of them may, at will, be swung either into a vertical position, as in Figs. 3 and 5, or into a horizontal one, as in Figs. 4 and 6. When swung into a vertical position these partitions form stalls for horses or cattle, and these stalls may either be longitudinally or transversely arranged relatively to the car without changing the character of the invention.

When the partitions are swung into a horizontal position, the outer edge on one side rests on a ledge, $d^1$, on the car, the central sections overlap, as in Figs. 4 and 6, and the other edge is likewise properly braced. The car is then converted into a "double-decker" without horizontal divisions.

The doors E of the car slide on ways *e*, in the usual manner. They are also divided horizontally into sliding panels $E^1$ $E^2$, which construction facilitates the loading of the animals, as hereinafter shown.

The central compartment $B^1$ of the car is, in this instance, provided with a partition, $D^1$, swinging on a pivot, $d^4$, transverse to the car. This partition is supported by rods $d^5$, hooked at their upper ends and sliding on ways $d^6$ inside the car. Owing to this mode of construction, the partition, when vertical, as shown by dotted lines in Fig. 2, can be moved toward one end or the other of the car, thus leaving more room for large stock to enter the stalls.

In loading large stock the doors E are opened, and the cattle driven into the stalls at one end of the car. The central partition $D^4$ is then moved close up to the posts at that end of the car, and the cattle driven into the stalls at the opposite ends. The central partition $D^4$ is then placed in its proper position and the cattle driven into the central stalls, thus filling the entire car.

In loading small stock the partitions are all arranged horizontally, the upper and lower panels opened, and the stock driven in until the car is full.

When the platforms are horizontal it is obvious that the upper portion of the car might be used as a receptacle for food for the stock, or that one part of the car might be used as a "single-decker," while the other part was used as a "double-decker," thus adapting the car to all the requirements of stockmen.

The partitions, it will be observed, are constructed in two parts, and so hinged together that one part may move upon the other, thus allowing one part to be vertical while the other is horizontal, thus still further facilitating the division of the car.

I claim as my invention—

1. The combination, with a stock-car, of partitions operating substantially as set forth, so that when vertical, they form stalls for large stock, but when horizontal, they divide the car into two compartments, one above the other, for the purposes specified.

2. The combination, with a stock-car, of partitions swinging on horizontal axes parallel to each other, so that when horizontal, one partition overlaps and is supported by the other, substantially as set forth.

3. The combination, with a stock-car, of partitions arranged parallel to each other lengthwise of the car, and swinging on horizontal axes, substantially as set forth, so that when vertical, the car is divided into longitudinal stalls, and when horizontal, the inner portions of the partitions overlap each other, while their outer portions are supported by the sides of the car.

4. The combination, with a stock-car, of swinging end partitions arranged longitudinally at each end of the car, with swinging central partitions arranged across the car, substantially as set forth, to facilitate the loading or unloading of the car, and to economize space.

5. The combination, with a stock-car, of a swinging sidewise-moving partition, $D^4$, constructed and operating substantially as set forth, so that it may be swung out of the way when not in use.

6. The double-leaved swinging partitions, constructed substantially as set forth, so that one leaf may be turned up or down without the other, for the purposes specified.

LEE SWEARINGEN.

Witnssses:
WM. MALLONEE,
S. L. SEMMELMAN.